(12) United States Patent
Engelstad et al.

(10) Patent No.: US 6,588,187 B2
(45) Date of Patent: Jul. 8, 2003

(54) HARVESTER ROW UNIT HEIGHT CONTROL WITH ELECTROHYDRAULIC PROPORTIONAL VALVE STRUCTURE

(75) Inventors: Jonathan Lee Engelstad, Ankeny, IA (US); Robert Carl Blad, Ankeny, IA (US); James William Riesterer, Pleasant Hill, IA (US); Byron Keith Miller, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/874,534

(22) Filed: Jun. 5, 2001

(65) Prior Publication Data

US 2002/0178710 A1 Dec. 5, 2002

(51) Int. Cl.[7] .......................... A01D 75/28; A01D 69/03
(52) U.S. Cl. .................... 56/10.2 E; 56/28; 56/DIG. 15
(58) Field of Search ........................ 56/10.2 R, 10.2 D, 56/10.2 E, 10.2 F, 28, 208, DIG. 7, DIG. 10, DIG. 15

(56) References Cited

U.S. PATENT DOCUMENTS

| | | | | |
|---|---|---|---|---|
| 4,136,508 A | * | 1/1979 | Coleman et al. ............... 56/208 |
| 4,327,540 A | * | 5/1982 | Swanson ...................... 56/11.9 |
| 4,335,561 A | * | 6/1982 | Swanson et al. .......... 56/10.2 E |
| 4,437,295 A | * | 3/1984 | Rock .............................. 172/4 |
| 5,090,184 A | * | 2/1992 | Garter et al. ............. 56/10.2 E |
| 5,115,628 A | * | 5/1992 | Garter et al. ............. 56/10.2 E |
| 5,299,413 A | * | 4/1994 | Gale ......................... 56/10.2 E |
| 5,359,836 A | | 11/1994 | Zeuner et al. ................ 56/10.2 |
| 5,471,825 A | * | 12/1995 | Panoushek et al. ....... 56/10.2 E |
| 5,519,988 A | | 5/1996 | Copley et al. .................. 56/30 |
| 5,704,200 A | * | 1/1998 | Chmielewski et al. .... 56/10.2 E |
| 5,794,421 A | * | 8/1998 | Maichle .................... 56/10.2 E |
| 5,961,573 A | * | 10/1999 | Hale et al. .................... 172/4.5 |
| 6,041,583 A | | 3/2000 | Goering et al. .............. 56/10.2 |
| 6,099,236 A | | 8/2000 | Wiechman ................... 414/708 |
| 6,202,395 B1 | * | 3/2001 | Gramm ........................... 172/4 |
| 6,289,659 B1 | * | 9/2001 | Fox .......................... 56/10.2 E |

* cited by examiner

Primary Examiner—Robert E. Pezzuto
Assistant Examiner—Nathan Mammen

(57) ABSTRACT

Row unit lift structure includes electrohydraulic proportional valves connected to an electronic controller which receives inputs from a manual raise/lower switch, a rate response potentiometer, and height control potentiometers in the cab. Signals are also received from row unit height sensing transducers, a tachometer and shaft rotation sensors. When the units are lowered and operational, the controller compares the signals from the height sensing transducers with the signals from the height control potentiometers and sends an electrical control signal to the proportional valves to maintain a selected row unit height. The magnitude of the control signal and thus the rate of correction of height are determined by the rate response potentiometer and the amount of variation between the actual and desired row unit height.

20 Claims, 2 Drawing Sheets

HARVESTER ROW UNIT HEIGHT CONTROL WITH ELECTROHYDRAULIC PROPORTIONAL VALVE STRUCTURE

FIELD OF THE INVENTION

The present invention relates generally to agricultural harvesters and, more specifically, to a height control for harvester row units.

BACKGROUND OF THE INVENTION

Harvesters such as cotton pickers include row units supported for vertical movement by lift arms controlled by hydraulic lift cylinders. Extension and retraction of the lift cylinders is controlled by spool valves connected to height sensing skids on the row units, such as shown in commonly assigned U.S. Pat. No. 5,519,988. Electrohydraulic valves provide an on/off function for oil flow to and from the cylinders. During field operations with the electrohydraulic valves in the on position, the skids mechanically move the spools to extend the cylinders when any unit is too low and retract the cylinders when all the units are too far above the surface of the field.

Present systems of the type shown in the aforementioned patent have complex hydraulic plumbing which is difficult and time-consuming to connect and maintain. In addition, adjustments of the operating height to provide efficient picking and prevent grounding are relatively difficult. System sensitivity and response time are not easily changed since linkage and internal hydraulic revisions are required. Maintaining good reliability and stability with the complex plumbing systems and mechanical linkages has been a continuing problem.

BRIEF SUMMARY OF THE INVENTION

It is therefore an object of the present invention to provide an improved height control system for a harvester row unit. It is a further object to provide such a unit which overcomes most or all of the aforementioned problems.

It is a further object to provide such an improved harvester row unit height control system with simplified and more reliable hydraulic plumbing compared to at least most available systems.

It is another object to provide such a harvester height control system which is less expensive and more reliable than most systems. It is still another object to provide such a system which has improved sensitivity and adjustability.

It is yet another object of the invention to provide a row unit height control system for a cotton harvester having improved reliability, sensitivity and adjustability. It is a further object to provide such a system which is less complex and costly than many previously available cotton harvester height control systems.

The improved hydraulic lift and height control system for a harvester includes electrohydraulic proportional valves to eliminate linkage-actuated valves. A single set of proportional valves connected to height control cylinders and to a controller provides manual or automatic harvester row unit height control. The controller receives inputs from a manual raise/lower switch, a rate response potentiometer, and height control potentiometers in the cab. Signals are also received from row unit height sensing transducers, a tachometer and shaft monitor. The operator actuates the raise/lower switch, which is conveniently located on the hydro control handle, to control extension and retraction of cylinders for movement of the row units between a raised transport position and a lowered field operating position. In the lowered position, the controller compares the signals from the height sensing transducers with the signals from the height control potentiometers and sends an electrical control signal to the proportional valves to maintain the row units at the height selected by the operator. The magnitude of the control signal and thus the rate of correction of height are determined by the rate response potentiometer and the amount of variation between the actual and desired row unit height. The controller prevents automatic operation if the relay to engage the row units is not turned on, and lowering of the row units is inhibited if the tachometer signal indicates the engine is not running.

The hydraulic control circuit includes a first proportional valve connected between a source of hydraulic fluid under pressure and the base end of a single acting cylinder to control cylinder extension for raising a set of row units, and a second proportional valve connected between the base end of the cylinder and a return to sump line to control cylinder retraction for lowering the set of row units. A low leakage, electrically controlled on-off valve is connected in series with a second proportional valve and has a normally closed position to prevent unwanted row unit lowering. The controller is connected to the on-off valve and provides a signal for turning the valve on for normal harvester operation.

These and other objects, features and advantages of the present invention will become apparent to one skilled in the art upon reading the following detailed description in view of the drawings.

DESCRIPTION OF THE PREFERRED EMBODIMENT

Figure 1:
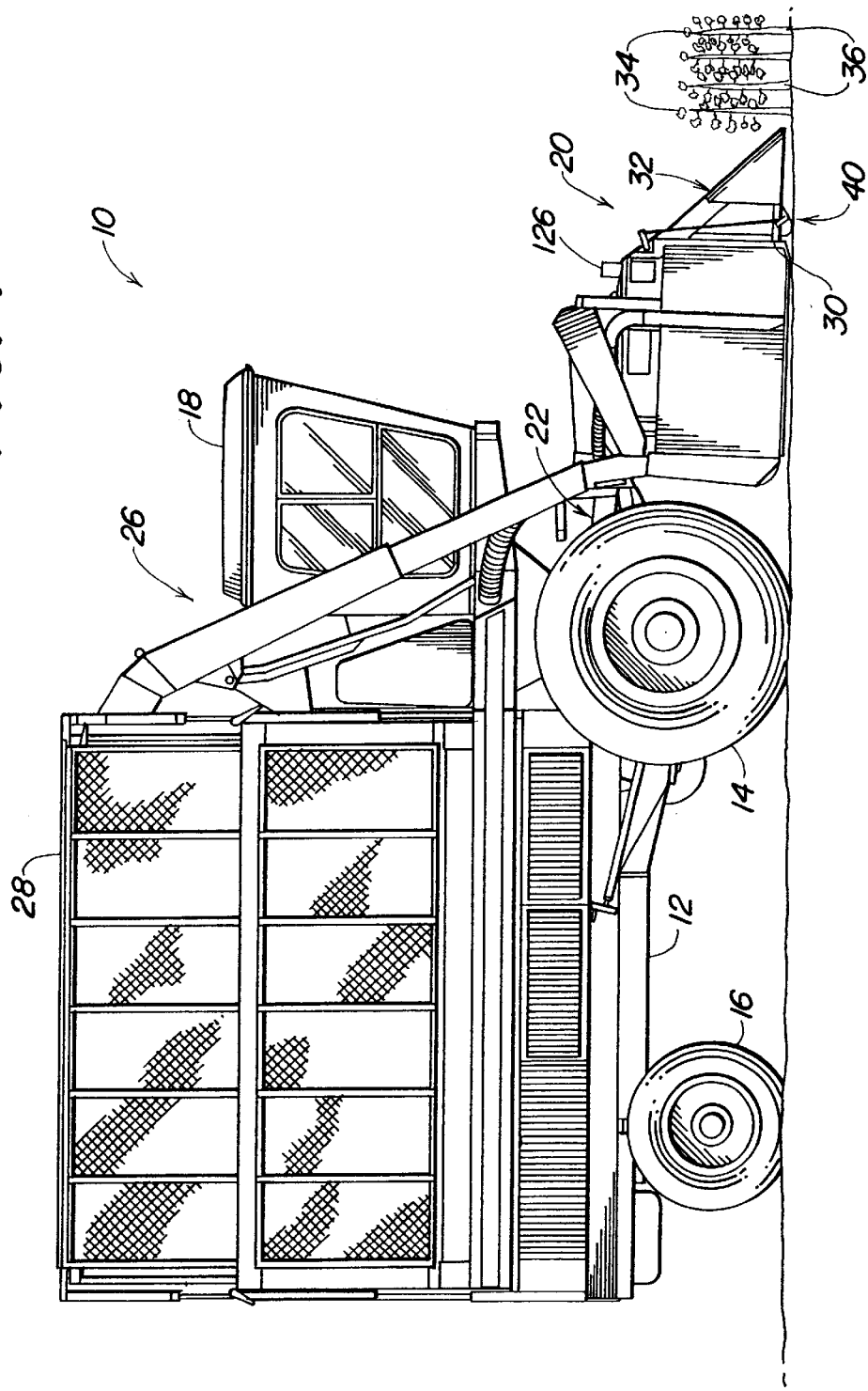
FIG. 1 is a side view of a cotton harvester having row units supported by a lift assembly.
Figure 2:
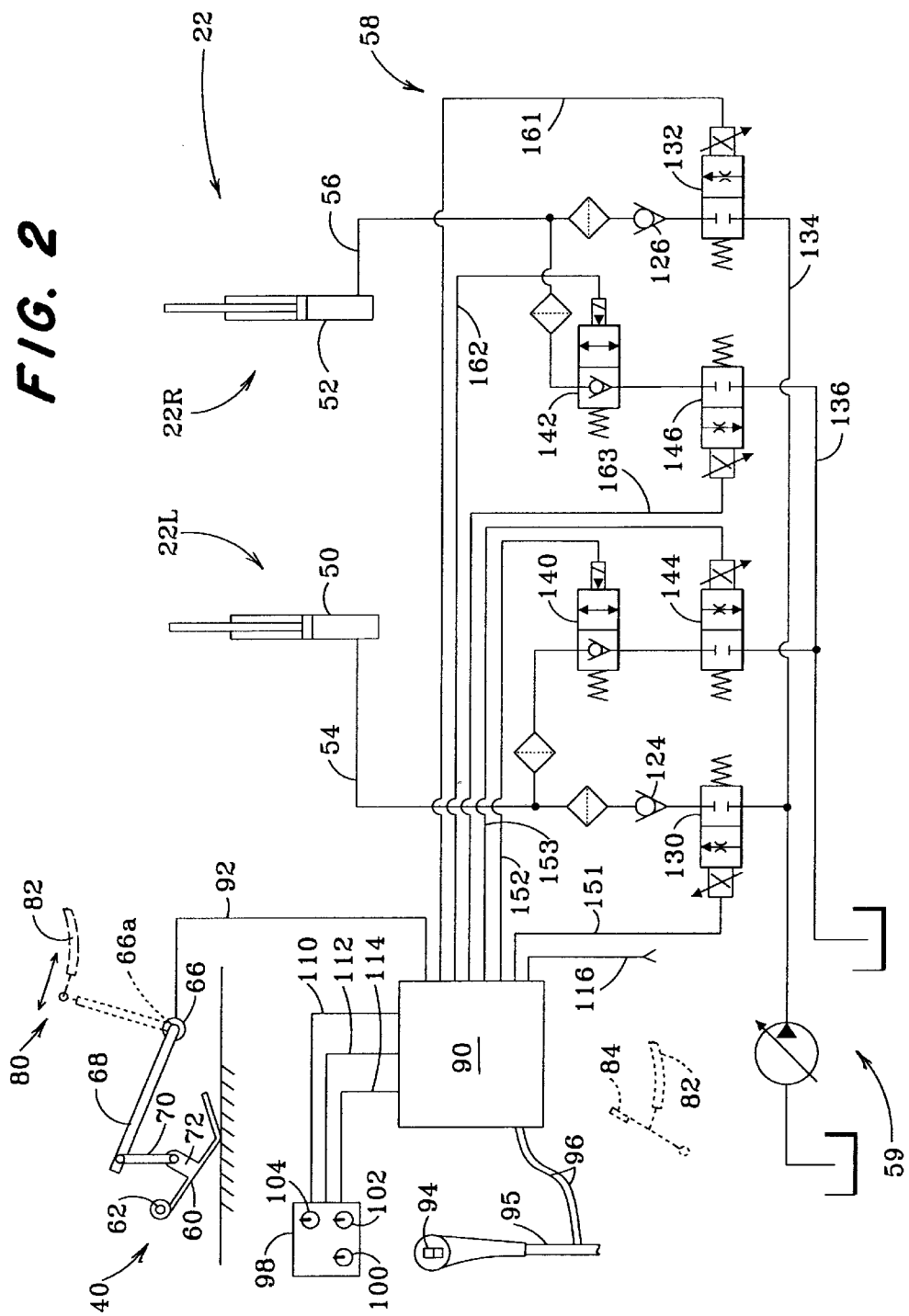
FIG. 2 is a schematic representation of the height control system utilized with the cotton harvester of FIG. 1.

Referring now to FIG. 1, therein is shown a cotton harvester 10 including a main frame 12 supported for forward movement over a field of plants to be harvested by forward drive wheels 14 and rear steerable wheels 16. A cab 18 is located at the forward end of the main frame 12. Transversely spaced multiple row harvesting units 20 are supported from the forward end of the frame 12 by hydraulically controlled lift structures 22. As shown in FIG. 2, two lift frames or structures 22L and 22R are provided for supporting two sets of row units 20 on the left- and right-hand sides of the harvester 10. The row units 20 remove cotton from rows of the plants, and an air duct system 26 directs the removed cotton rearwardly and upwardly into a basket 28. Although the row units 20 are shown mounted on a self-propelled harvester, it is to be understood that they can also be attached to a tractor in a conventional tractor mounted configuration.

Each of the row units 20 includes a forward frame assembly 30 supporting stalk lifter structure 32 which helps to guide adjacent rows of plants into the unit. A height sensing shoe assembly 40 is supported from the frame assembly 30 and controls the lift control structure 22, as described in further detail below, to maintain the unit 20 at a generally constant height above the ground during field operations as ground and surface conditions vary.

Referring to FIG. 2, therein is shown the height control system utilized with the harvester 10 of FIG. 1. The system provides row unit lift and lower functions and maintains a plurality of the row units 20 at the desired height above the ground to facilitate efficient crop removal and prevent grounding of the forward portion of the units during harvesting operations. Left- and right-hand cylinders 50 and 52, shown as single acting cylinders in FIG. 2, have base ends pivotally connected to the frame 12 and rod ends connected to conventional left- and right-hand row unit support frames. Typically, one to three row units 20 are supported by each of the support frames, and each row unit 20 includes a height sensing shoe assembly 40. An electronically controlled hydraulic circuit indicated generally at 58 and connected to a source of hydraulic fluid 59 provides hydraulic fluid flow to and from the cylinders 50 and 52 to raise and lower the units 20 between field working and transport positions and to control the height of the units while in the field working position.

Each shoe assembly 40 includes a ground sensor skid 60 having an end 62 pivotally connected to the row unit 20. A transducer 66 having a rotational axis 66a is supported on the unit 20 and includes a radially extending transducer arm 68. A link 70 connects the end of the arm 68 with a central portion 72 of the skid 60. The transducer 66 is preferably a hall effect sensor or other non-contact sensor which varies the electrical signal as the transducer arm 68 rotates about the axis 66a to provide a height signal dependent upon the height of the row unit 20 above the surface of the ground. Alternatively, the transducer 66 may be a variable resistor or other contact device. An adjustable position device 80 (broken lines of FIG. 2), including a cable 82 extending between the device 80 and an adjusting device 84 in the cab 18, allows an operator to conveniently vary the set point of the transducer 66 on-the-go from the cab as crop and field conditions change so that the transducer signal for a given row unit height can be changed for optimum performance.

The output of each transducer 66 is connected to an input of a controller 90 by a line 92. The controller 90 polls each of the lines 92 for the row units 20 on one row unit lift frame and calculates a correction signal for that frame based on the signals on the line. If the signal from the lowest row unit 20 drops a preselected amount from the desired signal for the preselected height, indicating the unit is too low, the controller 90 will cause the frame to lift so that unit will be farther from the ground. Similarly, if the signals from all of the row units 20 are greater than a predetermined amount from signals for the preselected height, indicating that the units are too high, the controller 90 will cause the frame to lower so that the units will be closer to the ground.

A manual lift and lower control 94 located on a hydro control handle 95 in the cab 18 is connected by lines 96 to the input of the controller 90. Left raise and right raise buttons are provided which can be individually operated if desired to raise either the left or right side of the header. Located on a console 98 of the cab 18 are left- and right-hand height controls 100 and 102 and a response rate control 104 connected to the input of the controller 90 by lines 110,112 and 114. A bus connection indicated at 116 to a shaft monitor and tachometer provides engine and row unit operational status signals to the controller 90 and facilitates communication between the controller and the tachometer when the tachometer is used as a diagnostic display in the cab 18.

The controller 90 includes conventional microprocessor based circuitry which compares the height signals from the transducers 66 on the lines 92 with the desired height set by the controls 100 and 102. If the actual detected height varies more than a preselected amount from the selected height, the controller 90 signals the hydraulic control circuit 58 to make the necessary change to reduce the variation. The rate of the correction is determined by the setting of the control 104.

The controller 90 polls the connection 116 to determine if the engine on the harvester 10 is running, and, if not, valve operation is prevented. Also, the controller 90 determines whether or not the row units 20 are operating by checking the status of a unit enable relay (not shown) for the units 20 via connection 116 and prevents operation in the automatic height control mode when the relay is not enabled.

The hydraulic control circuit 58 includes check valves 124 and 126 connected between the cylinder lines 54 and 56 and electrohydraulic proportional valves 130 and 132. The valves 130 and 132 have inputs connected to a pressure line 134 connected to the source 59. The cylinder lines 54 and 56 are also connected to a return line 136 through electrohydraulic check valves 140 and 142 and electrohydraulic proportional valves 144 and 146. The valves 130,132, and 140–146 have control inputs connected by lines 151–153 and 161–163 to the output of the controller 90. Since the control structure and description of operation for each of the lift structures 22L and 22R is generally the same, only that for the structure 22L will be described in detail below.

When the proportional valve 130 receives a lift signal from the controller 90 via line 151, the valve moves from the blocking position shown to the regulated flow position wherein the rate of fluid flow through the valve is determined by the signal level from the controller 90. The fluid flows from the pressure line 134 through the check valve 124 and into the base end of the cylinder 50 to extend the cylinder and raise the left-hand units 20. The valve 140, which is a normally closed, very low leakage blocking valve preventing retraction of the cylinder 50 when the harvester 10 is not operating, is activated whenever the automatic height control system is operational. While the cylinder 50 is extending, the controller 90 maintains valve 144 in the blocking position to prevent return flow to the line 136 through the open valve 144.

When the controller 90 detects that the manual control 94 is in the raise position, the valve 130 is moved to the fully open position for fast header lift. To move the header down from the transport position to the field working position, the operator moves the manual control 94 to the lower position. The row units 20 are moved downwardly until they reach the preselected operating heights. When the system is in an automatic height control mode, the controller 90 compares the height signals on the lines 92 with the desired height signal on line 110 set by the operator using the height control 100. If the units 20 start to drop below the desired range, the controller provides a signal on the line 151 to open the valve 130 and extend the cylinder 50. The valve 144 remains closed to prevent return flow to the return line 136. If the amount of deviation between actual and desired row unit height is small, the controller 90 provides a relatively low level of signal on the line 151 to slowly raise the units 20 until the signals on the lines 92 indicates the units are in the desired height range. However, if the difference between the actual and desired height is large, the valve 130 is opened further to assure that the units 20 are lifted quickly to prevent grounding of the units.

For retraction of the cylinder 50 to lower the units 20, the controller 90 signals the valve 144 via line 153 to move from the normal blocking position to the regulated flow position and signals the valve 130 via line 151 to the blocking position (shown). The cylinder 50 retracts at a rate dependent on the signal level from the controller 90 on the line 153.

Having described the preferred embodiment, it will become apparent that various modifications can be made without departing from the scope of the invention as defined in the accompanying claims.

We claim:

1. A harvester having a frame adapted for forward movement over a field and including a selectively operatable row unit supported for vertical movement relative to the frame by a hydraulic lift assembly, the harvester including height control structure for controlling the lift assembly comprising:

a ground sensor providing a height signal dependent on the position of the row unit relative to the surface of the ground;

a first proportional valve connected to a source of hydraulic pressure on the harvester and to the lift assembly;

an electronic controller connected to the first proportional valve and to the ground sensor, the controller responsive to the height signal for providing an electrical valve control signal to the first proportional valve to operate the lift assembly and maintain a preselected vertical position of the row unit relative to the ground in an automatic mode, wherein the valve control signal is dependent on the difference between the preselected vertical position and actual row unit position relative to the ground; and an electrohydraulic valve connected to the controller and the lift assembly and having an on position for providing lift assembly operation for lowering the row unit and a closed position for preventing lowering of the row unit, the electrohydraulic valve responsive to an operational signal from the controller to select the closed position of the valve and prevent the lowering of the row unit when the row unit is not operating.

2. The height control structure set forth in claim 1 further including an adjustment connected to the electronic controller for varying rate of flow through the proportional valve in dependence on the height signal to thereby adjust rate of response of the lift assembly.

3. The height control structure set forth in claim 1 including a second proportional valve connected between the lift assembly and a return line to the source of hydraulic pressure, the controller providing simultaneous control of the proportional valves to effect raising and lowering of the lift assembly.

4. The height control structure set forth in claim 3 wherein the second proportional valve is connected in series with the electrohydraulic valve to prevent unwanted lowering of the lift assembly when the harvester is not operating in the automatic mode.

5. The height control structure set forth in claim 1 wherein the ground sensor comprises a hall effect sensor.

6. The height control structure set forth in claim 5 including operator control structure for varying the set point of the ground sensor from a location remote from the ground sensor.

7. The height control structure set forth in claim 1 wherein the ground sensor includes a ground engaging skid connected to a variable resistor.

8. The height control structure set forth in claim 1 wherein the hydraulic lift assembly comprises a single acting cylinder having a base end connected through the first proportional valve to a hydraulic pressure line, the base end also connected through a second proportional valve to a hydraulic return line, the controller simultaneously controlling the first and second proportional valves to raise and lower the row unit.

9. A harvester having a frame adapted for forward movement over a field and including a row unit supported for vertical movement relative to the frame by a hydraulic lift assembly, the harvester including height control structure for controlling the lift assembly comprising:

a ground sensor providing a height signal dependent on the position of the row unit relative to the surface of the ground;

a first proportional valve connected to a source of hydraulic pressure on the harvester and to the lift assembly;

an electronic controller connected to the first proportional valve and to the ground sensor, the controller responsive to the height signal for providing an electrical valve control signal to the first proportional valve to operate the lift assembly and maintain a preselected vertical position of the row unit relative to the ground in an automatic mode, wherein the valve control signal is dependent on the difference between the preselected vertical position and actual row unit position relative to the ground;

an electrohydraulic valve connected to the controller and the lift assembly and having an on position for providing lift assembly operation for lowering the row unit and a closed position for preventing lowering of the row unit;

a second proportional valve connected between the lift assembly and a return line to the source of hydraulic pressure, the controller providing simultaneous control of the proportional valves to effect raising and lowering of the lift assembly;

wherein the second proportional valve is connected in series with the electrohydraulic valve to prevent unwanted lowering of the lift assembly when the harvester is not operating in the automatic mode; and wherein the controller includes an input receiving a row unit status device signal and provides a signal to the electrohydraulic valve for moving the electrohydraulic valve to the closed position when the row unit status device signal indicates the unit is not operating.

10. A harvester having a frame adapted for forward movement over a field and including a row unit supported for vertical movement relative to the frame by a hydraulic lift assembly, the harvester including height control structure for controlling the lift assembly comprising:

a ground sensor providing a height signal dependent on the position of the row unit relative to the surface of the ground;

a first proportional valve connected to a source of hydraulic pressure on the harvester and to the lift assembly;

an electronic controller connected to the first proportional valve and to the ground sensor, the controller responsive to the height signal for providing an electrical valve control signal to the first proportional valve to operate the lift assembly and maintain a preselected vertical position of the row unit relative to the ground in an automatic mode, wherein the valve control signal is dependent on the difference between the preselected vertical position and actual row unit position relative to the ground;

an electrohydraulic valve connected to the controller and the lift assembly and having an on position for providing lift assembly operation for lowering the row unit and a closed position for preventing lowering of the row unit;

wherein the hydraulic lift assembly comprises a single acting cylinder having a base end connected through the first proportional valve to a hydraulic pressure line, the base end also connected through a second proportional valve to a hydraulic return line, the controller simultaneously controlling the first and second proportional valves to raise and lower the row unit; and wherein the controller is responsive to a row unit enabled signal and prevents operation in the automatic mode when the row unit is not enabled.

11. A harvester having a frame adapted for forward movement over a field and including a row unit supported for vertical movement relative to the frame by a hydraulic lift assembly, height control structure for controlling the lift assembly comprising:

a ground sensor providing a height signal dependent on the position of the row unit relative to the surface of the ground;

electrohydraulic proportional valve structure connected to a source of hydraulic pressure on the harvester and to the lift assembly;

an electronic controller connected to the proportional valve structure and to the ground sensor, the controller responsive to the height signal for providing an electrical valve control signal to the proportional valve structure to operate the lift assembly and maintain a preselected vertical position of the row unit relative to the ground, wherein the control valve signal is dependent on the difference between the preselected vertical position and actual row unit position relative to the ground;

wherein the controller includes an adjustment for varying the control valve signal for a given height signal to adjust rate of response of the lift assembly; and wherein the ground sensor comprises a transducer located on the row unit, and further comprising means for adjusting the position of at least a portion of the transducer from a location remote from the row unit to vary the output of the ground sensor for a given position of the row unit relative to the surface of the ground.

12. The height control structure set forth in claim 11 further including an electrohydraulic valve connected to the controller and to the proportional valve structure, the electrohydraulic valve having an on position for providing lift assembly operation including lowering of the row unit and a closed position for preventing lowering of the row unit.

13. The height control structure set forth in claim 11 wherein the ground sensor comprises a rotary type transducer, and the means for adjusting the position includes means for adjusting the angular position of the rotary type transducer.

14. The height control structure set forth in claim 13 wherein the transducer comprises a hall effect transducer.

15. A harvester having a frame adapted for forward movement over a field and including a row unit supported for vertical movement relative to the frame by a hydraulic lift assembly, height control structure for controlling the lift assembly comprising:

a ground sensor providing a height signal dependent on the position of the row unit relative to the surface of the ground;

electrohydraulic proportional valve structure connected to a source of hydraulic pressure on the harvester and to the lift assembly;

an electronic controller connected to the proportional valve structure and to the ground sensor, the controller responsive to the height signal for providing an electrical valve control signal to the proportional valve structure to operate the lift assembly and maintain a preselected vertical position of the row unit relative to the ground, wherein the control valve signal is dependent on the difference between the preselected vertical position and actual row unit position relative to the ground;

wherein the controller includes an adjustment for varying the control valve signal for a given height signal to adjust rate of response of the lift assembly; and wherein the controller includes an input providing harvester engine and row unit operation signals, and wherein the controller is responsive to the operation signals to limit operation of the lift assembly when the row unit is not operating.

16. A harvester having a frame adapted for forward movement over a field and including a row unit supported for vertical movement relative to the frame by a hydraulic height control cylinder, height control structure for controlling the row unit comprising:

a first proportional valve connected to height control cylinder and to a source of hydraulic fluid under pressure;

a second proportional valve connected to the height control cylinder and to the source;

a controller connected to the first and second proportional valves;

a raise/lower switch and an adjustable row unit height selector connected to the controller;

a height sensing transducer connected to the controller and providing a row unit height indication;

wherein the controller is operable in an automatic height control mode and is responsive to the unit height indication and the height selector adjustment to provide an electrical control signal to the proportional valves to automatically maintain the row unit at a preselected operating height; and an electrohydraulic valve connected to the proportional valves, wherein the controller includes an input receiving a row unit operational status signal, the controller responsive to the signal for moving the electrohydraulic valve to a position preventing operation in the automatic height control mode when the signal indicates a preselected unit operational condition.

17. The height control structure set forth in claim 16 further including an adjustable response rate control connected to the controller, wherein the magnitude of the electrical control signal is dependent on the response rate control adjustment.

18. The height control structure set forth in claim 16 wherein the source of hydraulic fluid includes a pressure line and a return line, and wherein the first proportional valve is connected to the pressure line and the second proportional valve is connected to the return line, and the electrohydraulic valve structure includes an on-off valve connected to the second proportional valve and to the controller to selectively prevent flow from the cylinder to the return line.

19. The height control structure set forth in claim 18 wherein the height control cylinder comprises a single acting cylinder having a base end connected to the first and second proportional valves, the on-off valve comprising a normally closed low leakage valve preventing retraction of the cylinder when in the off position.

20. The height control circuit set forth in claim 19 wherein the on-off valve is connected in series with the second proportional valve between the return line and the base end of the cylinder.

* * * * *